(12) United States Patent
Takahashi (10) Patent No.: US 8,250,238 B2
(45) Date of Patent: Aug. 21, 2012

(54) NETWORK DEVICE, ADDRESS CHANGE NOTIFICATION METHOD, AND ADDRESS CHANGE NOTIFICATION PROGRAM

(75) Inventor: Yukio Takahashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/319,460

(22) Filed: Jan. 7, 2009

(65) Prior Publication Data

US 2009/0177786 A1    Jul. 9, 2009

(30) Foreign Application Priority Data

Jan. 9, 2008    (JP) ................ P2008-002628

(51) Int. Cl.
- G06F 15/16    (2006.01)
- G06F 15/173    (2006.01)
- G06F 11/00    (2006.01)
- H04L 12/28    (2006.01)
- H04L 12/50    (2006.01)
- H04W 4/00    (2009.01)

(52) U.S. Cl. ........ 709/245; 709/203; 709/204; 709/207; 709/217; 709/224; 709/225; 709/227; 709/230; 709/238; 709/247; 370/236; 370/251; 370/254; 370/255; 370/331; 370/386; 370/389; 370/392; 370/401

(58) Field of Classification Search .................. None
See application file for complete search history.

(56) References Cited

U.S. PATENT DOCUMENTS

| | | | | |
|---|---|---|---|---|
| 4,428,042 A * | 1/1984 | Niethhammer et al. | ...... | 370/251 |
| 6,513,061 B1 * | 1/2003 | Ebata et al. | ...... | 709/203 |
| 6,813,635 B1 * | 11/2004 | Jorgenson | ...... | 709/225 |
| 6,944,167 B1 * | 9/2005 | McPherson | ...... | 370/401 |
| 7,451,234 B1 * | 11/2008 | Bonner | ...... | 709/245 |
| 7,720,997 B1 * | 5/2010 | Gourlay et al. | ...... | 709/245 |
| 7,945,036 B1 * | 5/2011 | Tonogai et al. | ...... | 379/201.12 |
| 2002/0010798 A1 * | 1/2002 | Ben-Shaul et al. | ...... | 709/247 |
| 2002/0120607 A1 * | 8/2002 | Price et al. | ...... | 707/1 |
| 2003/0055893 A1 * | 3/2003 | Sato et al. | ...... | 709/204 |
| 2004/0083306 A1 * | 4/2004 | Gloe | ...... | 709/245 |
| 2004/0125801 A1 * | 7/2004 | Nawata | ...... | 370/389 |
| 2004/0148398 A1 * | 7/2004 | Park | ...... | 709/227 |

(Continued)

FOREIGN PATENT DOCUMENTS

JP    2004-260804 A    9/2004

(Continued)

Primary Examiner — Ario Etienne
Assistant Examiner — Ho Shiu
(74) Attorney, Agent, or Firm — Lerner, David, Littenberg, Krumholz & Mentlik, LLP (57) ABSTRACT

A network device includes a storage unit configured to store an IP address assigned to the network device as an address to be sent to a plurality of domain name servers in which an address-domain mapping relationship between the IP address and a domain name of the network device is to be registered, a server searching unit configured to search for an in-operation domain name server among the plurality of domain name servers, the in-operation domain name server being a domain name server that is currently operating, a software holding unit configured to hold a plurality of unique communication program modules, each corresponding to one of the plurality of domain name servers, and an address notifying unit configured to notify the in-operation domain name server of the IP address through a corresponding one of the communication program modules to register the address-domain mapping relationship in the in-operation domain name server.

5 Claims, 7 Drawing Sheets

U.S. PATENT DOCUMENTS

| | | | |
|---|---|---|---|
| 2004/0210791 A1* | 10/2004 | Akagawa et al. | 714/2 |
| 2005/0050227 A1* | 3/2005 | Michelman | 709/245 |
| 2005/0074008 A1* | 4/2005 | Herledan et al. | 370/392 |
| 2005/0286510 A1* | 12/2005 | Nakajima et al. | 370/386 |
| 2006/0010199 A1* | 1/2006 | Brailean et al. | 709/204 |
| 2006/0112176 A1* | 5/2006 | Liu et al. | 709/223 |
| 2006/0206608 A1* | 9/2006 | Naito et al. | 709/224 |
| 2006/0253539 A1* | 11/2006 | Casperson et al. | 709/207 |
| 2007/0067490 A1* | 3/2007 | Grimminger et al. | 709/245 |
| 2007/0088815 A1* | 4/2007 | Ma et al. | 709/224 |
| 2007/0128899 A1* | 6/2007 | Mayer | 439/152 |
| 2007/0165542 A1* | 7/2007 | Shin et al. | 370/254 |
| 2007/0168458 A1* | 7/2007 | Costa-Requena et al. | 709/217 |
| 2007/0223381 A1* | 9/2007 | Radtke | 370/236 |
| 2007/0234061 A1* | 10/2007 | Teo | 713/178 |
| 2007/0236340 A1* | 10/2007 | White, II | 340/310.11 |
| 2007/0237115 A1* | 10/2007 | Bae et al. | 370/331 |
| 2007/0283028 A1* | 12/2007 | Gilroy et al. | 709/230 |
| 2008/0002686 A1* | 1/2008 | Valli et al. | 370/389 |
| 2008/0040423 A1* | 2/2008 | Chen et al. | 709/203 |
| 2008/0162724 A1* | 7/2008 | Hietasarka | 709/245 |
| 2008/0180524 A1* | 7/2008 | Lin et al. | 348/143 |
| 2009/0086029 A1* | 4/2009 | Wei et al. | 348/207.1 |
| 2009/0106213 A1* | 4/2009 | Danforth et al. | 707/4 |
| 2009/0106453 A1* | 4/2009 | Miura | 709/245 |
| 2009/0174784 A1* | 7/2009 | Karlsson et al. | 348/222.1 |
| 2009/0274062 A1* | 11/2009 | Yan et al. | 370/254 |
| 2010/0077023 A1* | 3/2010 | Eriksson | 709/203 |

FOREIGN PATENT DOCUMENTS

| | | |
|---|---|---|
| JP | 2006-101330 A | 4/2006 |
| JP | 2007274203 A | 10/2007 |

* cited by examiner

NETWORK DEVICE, ADDRESS CHANGE NOTIFICATION METHOD, AND ADDRESS CHANGE NOTIFICATION PROGRAM

CROSS REFERENCES TO RELATED APPLICATIONS

The present application claims priority from Japanese Patent Application No. JP 2008-002628, filed in the Japanese Patent Office on Jan. 9, 2008, the entire content of which is incorporated herein by reference.

BACKGROUND OF THE INVENTION

1. Field of the Invention

The present invention relates to a network device, an address change notification method, and an address change notification program. The present invention is suitable for application to, for example, but is not limited to, a network system that is established so that a camera located in a specific location can be accessed from an external personal computer via the Internet.

2. Description of the Related Art

For example, network systems have been proposed which can allow a user in a distant location to access a security camera located in a user's home from an external personal computer via the Internet to visually check video footage captured by the security camera (see, for example, Japanese Unexamined Patent Application Publication No. 2006-101330).

In the personal computer, when an Internet protocol (IP) address of the security camera is specified on a Web browser, video footage currently being captured by the security camera is received via the Internet and is displayed on a monitor.

In such communication via the Internet, a system called Domain Name System (DNS) is generally used. In the DNS, an IP address having random numbers as large as 32 bits is converted into a domain name that is intelligible and discernable to a person. This allows a user to easily access a desired IP address by performing a simple operation, that is, merely by inputting a domain name on a Web browser, without being conscious of the IP address.

In general, when a security camera is to be connected to the Internet, the security camera does not have a fixed global IP address and a dynamic global IP address is used. The dynamic global IP address is assigned by a dynamic host configuration protocol (DHCP) server of an Internet service provider (ISP) at a predetermined time such as when the security camera is connected to the Internet.

Since a global IP address is dynamically assigned, if the global IP address is frequently changed, the mapping relationship between the global IP address and the domain name is updated in the DNS every time the change occurs, and such a process is time-consuming.

If a domain name based on a fixed global IP address is obtained, it is possible to access the security camera at any time using the same domain name. However, this involves high cost for registration, maintenance management, or the like, and is not suitable for personal use.

In the network systems, therefore, accessing the security camera involves correctly inputting a global IP address which is changed from time to time to make a connection request, leading to a problem that may cause a user to perform a time-consuming operation.

In order to solve the problem, recently, a system called Dynamic Domain Name System (DDNS) has been available.

The DDNS is a system that allows mapping between a global IP address which is dynamically changed and a domain name on the Internet.

For example, it is assumed that a DDNS server having a domain named "ABC.co.jp" exists and a domain name "xxx.ABC.co.jp" is assigned to a personal security camera.

In this example, when a user inputs the domain name "xxx.ABC.co.jp" in an address input field in order to access the security camera via the Internet from an external personal computer, the DDNS server having the domain named "ABC.co.jp" converts the domain name into a global IP address mapped and registered with the domain name "xxx.ABC.co.jp" to allow connection to the security camera assigned the global IP address.

In other words, each time the global IP address assigned to the security camera is changed, the DDNS server updates the registered mapping relationship between the domain name and the global IP address. Thus, instead of the global IP address, the domain name of the security camera can be used.

In a home, a single global IP address may often be used for a security camera and a plurality of other network terminals such as a notebook-shaped mobile personal computer (hereinafter referred to as a "mobile PC") via a router.

In this case, the router that is assigned the global IP address assigns a private IP address to the security camera located in the home. The security camera is accessed with the global IP address on the Internet using a port forwarding function on the router used as a gateway.

The port forwarding function is a function that allows access to a specific port number of a router from the Internet to be forwarded to, for example, a security camera in a home having a specific private IP address. The port forwarding function allows the security camera to be also used as a Web server via the Internet.

SUMMARY OF THE INVENTION

In a network system having the configuration described above, once the mapping relationship between a domain name and global IP address of a router is registered via a DDNS server, a user can receive video footage of a security camera corresponding to a specific port number using the port forwarding function when the user accesses the router from an external personal computer. However, the network system involves problems. For example, when the DDNS server changes service providing conditions or a service providing period or when the target DDNS server is changed, it is difficult to connect to the security camera if the domain name is accessed from the external personal computer.

It is therefore desirable to provide a network device, an address change notification method, and an access change notification program which ensure access to a device from an external device, even when an IP address of the device is changed, by sending a changed IP address without relying on a fixed domain name server.

In an embodiment of the present invention, an Internet-protocol address assigned to a device is stored as a notification address to be sent to a plurality of domain name servers in which an address-domain mapping relationship between the Internet-protocol address and a domain name of the device is to be registered; an in-operation domain name server that is currently operating is searched for among the plurality of domain name servers; a plurality of unique communication program modules, each corresponding to one of the plurality of domain name servers, are held in advance; and the Internet-protocol address is sent to the in-operation domain name server through a corresponding one of the communication program modules to register the address-domain mapping relationship in the in-operation domain name server.

According to an embodiment of the present invention, an in-operation domain name server that is currently operating is searched for without relying on a single fixed domain name server, and the Internet-protocol address is sent to the in-operation domain name server using a corresponding communication program module. Thus, an address-domain mapping relationship can be registered in the in-operation domain name server. Therefore, a network device, an address change notification method, and an access change notification program which ensure access to a device from an external device, even when an Internet-protocol address of the device is changed, by sending a changed Internet-protocol address without relaying on a fixed domain name server can be achieved.

DESCRIPTION OF THE PREFERRED EMBODIMENTS

An embodiment of the present invention will be described in detail hereinafter with reference to the drawings.
Overall Structure of Network System Referring to FIG. 1, a network system 1 is configured such that an Internet service provider (hereinafter referred to as an "ISP") 2, a device or devices in a home 3, a device or devices in an office 4, and a plurality of DDNS administrators 5A, 5B, and 5C are connected via the Internet 6.

Figure 1:
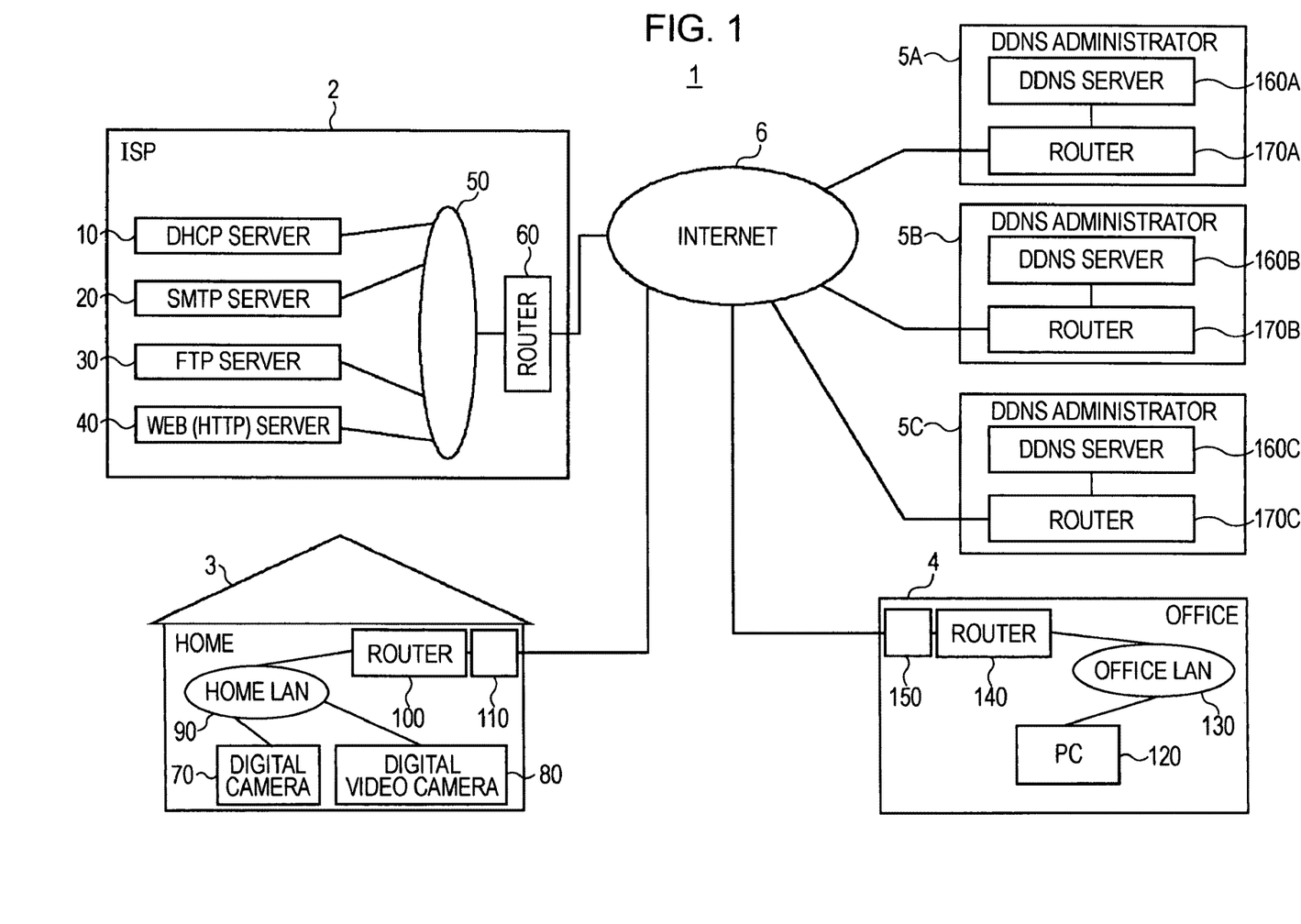
FIG. 1 is a schematic block diagram showing an overall structure of a network system according to an embodiment of the present invention.

In the ISP 2, a DHCP server 10, a simple mail transfer protocol (SMTP) server 20, a file transfer protocol (FTP) server 30, and a Web server 40 are connected via an internal network 50 and are further connected to the Internet 6 through a router 60.

The DHCP server 10 is configured to dynamically assign a global IP address to a router 100 in the home 3 or a router 140 in the office 4 so that the routers 100 and 140 can be accessed from the Internet 6.

The SMTP server 20 is configured to receive electronic mail to be sent to a certain party from a digital camera 70 or a digital video camera 80 in the home 3 and to transfer it to a post office protocol (POP) server of another ISP (not shown) to which the party is subscribed.

The FTP server 30 is configured to receive an image file from the digital camera 70 or the digital video camera 80 in the home 3 and to upload it to the Web server 40. The Web server 40 is configured to provide the uploaded image file in accordance with a request from a personal computer 120 in the office 4.

The digital camera 70 and the digital video camera 80 are located in the home 3, and are connected to the Internet 6 through the router 100 and a modem 110 from a home local area network (LAN) 90. Examples of the modem 110 may include an asymmetric digital subscriber line (ADSL) modem and an optical terminator.

The personal computer 120 is located in the office 4, and is connected to the Internet 6 through the router 140 and a modem 150 from an office LAN 130. Examples of the modem 150 may include an ADSL modem and an optical terminator.

The DDNS administrator 5A is configured such that a DDNS server 160A is connected to the Internet 6 through a router 170A so as to provide a DDNS service on the Internet 6.

The DDNS administrator 5B is also configured such that a DDNS server 160B is connected to the Internet 6 through a router 170B so as to provide a DDNS service on the Internet 6. The DDNS administrator 5C is also configured such that a DDNS server 160C is connected to the Internet 6 through a router 170C so as to provide a DDNS service on the Internet 6.

In the network system 1, by way of example, the digital camera 70 and the digital video camera 80 in the home 3 preferentially receive a DDNS service from the DDNS administrator 5A. The DDNS administrators 5B and 5C are registered in advance in the digital camera 70 and the digital video camera 80 as auxiliary access destinations so that the DDNS administrators 5B and 5C can be used as promising candidates.

The DDNS service provided by the DDNS server 160A may be a service that associates a global IP address assigned to the router 100 in the home 3 and dynamically changed at predetermined time intervals with a domain name of the router 100 on the Internet 6. Note that this DDNS service may be provided by the ISP 2 instead of the DDNS administrators 5A to 5C.

When a user inputs the domain name of the router 100 in the home 3 in order to access the router 100 via the Internet 6 from the personal computer 120 in the office 4, the DDNS server 160A converts the domain name into a global IP address mapped and registered with the domain name to allow connection to the router 100 assigned the global IP address.

The router 100 in the home 3 is configured to be assigned a global IP address, which can be accessed from the Internet 6, by the DHCP server 10 of the ISP 2, and is also configured to individually assign local IP addresses to the digital camera 70 and digital video camera 80 connected via the home LAN 90 using an internal DHCP server function of the router 100. The port forwarding function on the router 100 allows access from the personal computer 120 in the office 4 via the Internet 6 to be forwarded to the digital camera 70 or the digital video camera 80.

The router 100 may not necessarily have the DHCP server function. If the router 100 does not have the DHCP server function, the DHCP server 10 of the ISP 2 directly assigns a global IP address to one of the digital camera 70 and the digital video camera 80.

In the network system 1 having the configuration described above, for example, the user of the digital camera 70 and the digital video camera 80 in the home 3 who is working in the office 4 can access the digital video camera 80 in the home 3 via the Internet 6 from the personal computer 120 to monitor events or conditions within his or her home with the digital video camera 80 while he or she is absent.

Structure of Digital Video Camera

The network system 1 can allow either a still image captured by the digital camera 70 or a moving image captured by the digital video camera 80 to be accessed from the personal computer 120 in the office 4. A circuit structure and software configuration of the digital video camera 80 will be described with respect to an example in which moving images captured by the digital video camera 80 are received and monitored.

The digital camera 70 is designed to mainly capture still images, which is different from the digital video camera 80 that is designed to mainly capture moving images. However, the digital camera 70 has basically the same circuit structure as the digital video camera 80, and a circuit structure and software configuration thereof will not described herein for convenience of description.

Circuit Structure of Digital Video Camera

Figure 2:
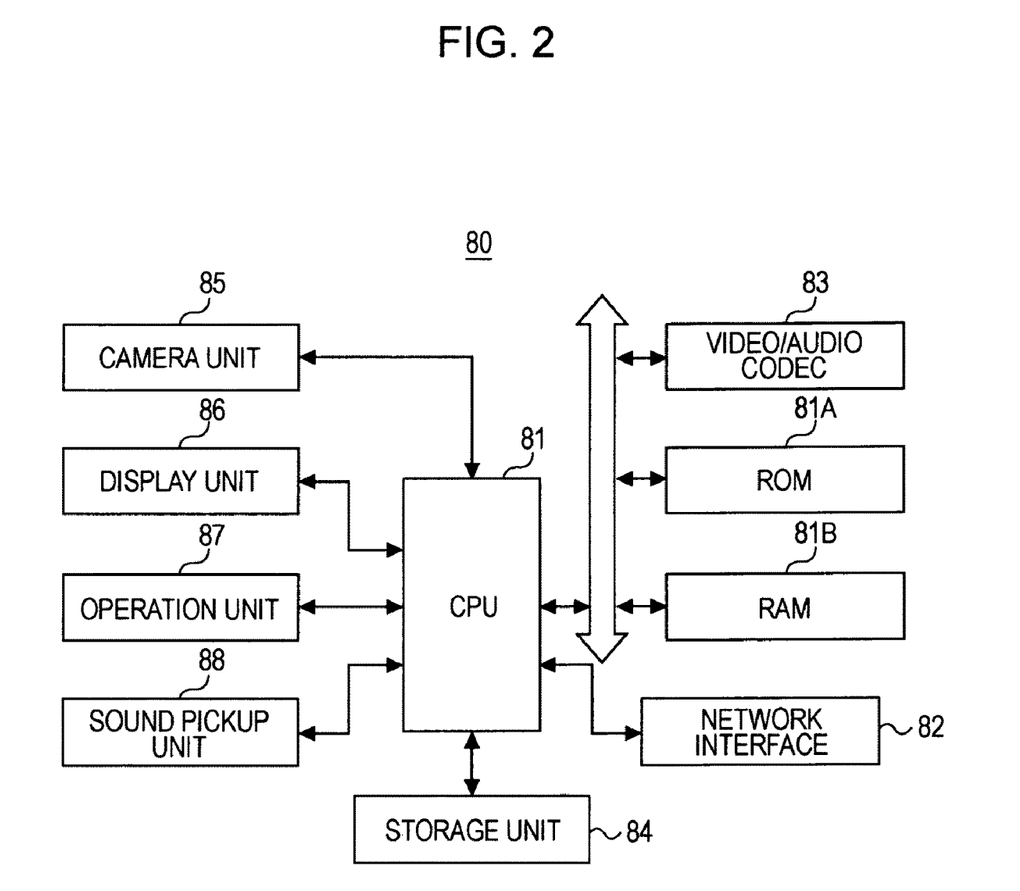
FIG. 2 is a schematic block diagram showing a circuit structure of a digital video camera.

As shown in FIG. 2, the digital camera 80 is configured such that a central processing unit (CPU) 81 starts a basic program such as an operating system (OS) and various application programs stored in a read only memory (ROM) 81A on a random access memory (RAM) 81B to thereby execute a video capturing process and reproducing process as well as an address change notification process described below.

In the digital video camera 80, in actual use, in response to a user operation using an operation unit 87, moving images or still images of locations in and around the home 3 are captured by a camera unit 85 such as a charge coupled device (CCD) unit, and footage based on the captured data is displayed on a display unit 86 such as a liquid crystal display (LCD). The captured data is further compressed and encoded by a video/audio codec 83 and is then recorded on a storage unit 84 such as a semiconductor memory.

In the digital video camera 80, furthermore, sound in and around the home 3, as well as the captured data, is also obtained by a sound pickup unit 88 such as a microphone to produce audio data. The audio data is then compressed and encoded by the video/audio codec 83 and is then recorded on the storage unit 84.

The digital video camera 80 is further connected to the home LAN 90 through a network interface 82 so as to receive access from the Internet 6 through the router 100 and the modem 110.

The network interface 82 may support wired connection via Ethernet or wireless connection using an Institute of Electrical and Electronic Engineers (IEEE) 802.11a/b/g or Bluetooth® module or any other suitable device.

Figure 3:
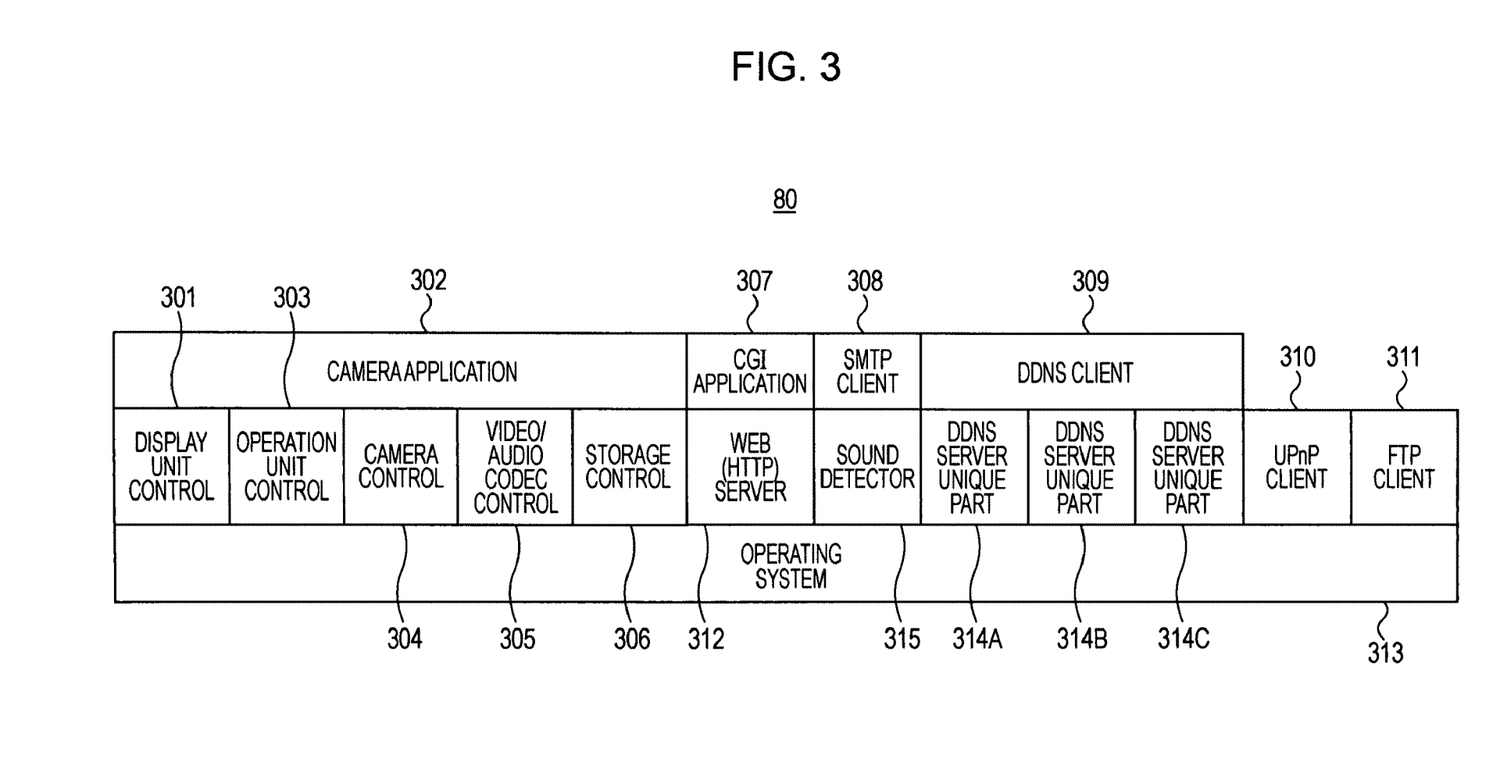
FIG. 3 is a schematic diagram showing a software configuration of the digital video camera.

A software configuration for implementing, by the CPU 81 of the digital video camera 80, functions thereof according to the basic program and application programs will now be described with reference to FIG. 3.

Software Configuration of Digital Video Camera

The digital video camera 80 includes a display unit control software module 301 configured to control display of the display unit 86 (see FIG. 2), an operation unit control software module 303 configured to control the operation unit 87, a camera control software module 304 configured to perform various types of control for the capturing operation of the camera unit 85, a video/audio codec control software module 305 configured to perform various types of control for the video/audio codec 83, a storage control software module 306 configured to perform various types of control for the storage unit 84, and a camera application 302 configured to control the software modules described above, which are activated using an operating system software module 313.

The digital video camera 80 further includes a Web server 312 configured to make a response to hyper text transfer protocol (http) access from outside, a common gateway interface (CGI) application 307 configured to start the Web server 312 in response to a request from a Web browser of an external device, e.g., the personal computer 120, an SMTP client software module 308 configured to transmit and receive electronic mail, a sound detection module 315 configured to detect sound, a DDNS client software module 309 configured to access external devices, e.g., the DDNS servers 160A to 160C, DDNS server unique part software modules 314A to 314C having client functions based on an application program interface (API), such as access procedures and instructions for transactions, which individually correspond to the DDNS servers 160A to 160C, a Universal Plug and Play (UPnP) client software module 310, and an FTP client software module 311, which are activated using the operating system software module 313.

Global IP Address Change Notification Process

In the network system 1 having the configuration described above, when a user is to access the digital video camera 80 that is assigned a local IP address by the router 100 in the home 3 from the personal computer 120 in the office 4 via the Internet 6, it is necessary to notify one of the DDNS servers 160A to 160C of the DDNS administrators 5A to 5C of a global IP address that is currently assigned to the router 100 in the home 3 by the DHCP server 10 of the ISP 2 in order to map the domain name of the router 100 with the global IP address of the router 100.

In the network system 1, furthermore, if the digital video camera 80 is directly assigned a global IP address by the DHCP server 10 of the ISP 2 in a case where the router 100 in the home 3 does not have the DHCP server function, it is necessary to notify one of the DDNS servers 160A to 160C of the DDNS administrators 5A to 5C of the global IP address in order to map the domain name of the digital video camera 80 with the global IP address of the digital video camera 80.

In the network system 1, furthermore, when the global IP address currently assigned to the router 100 or the digital video camera 80 in the home 3 is dynamically changed to a global IP address having a different value by the DHCP server 10 after a predetermined period of time has elapsed, it is also necessary to notify one of the DDNS servers 160A to 160C of the DDNS administrators 5A to 5C of the new global IP address in order to map the domain name of the router 100 or the digital video camera 80 with the global IP address of the router 100 or the digital video camera 80.

Figure 4:
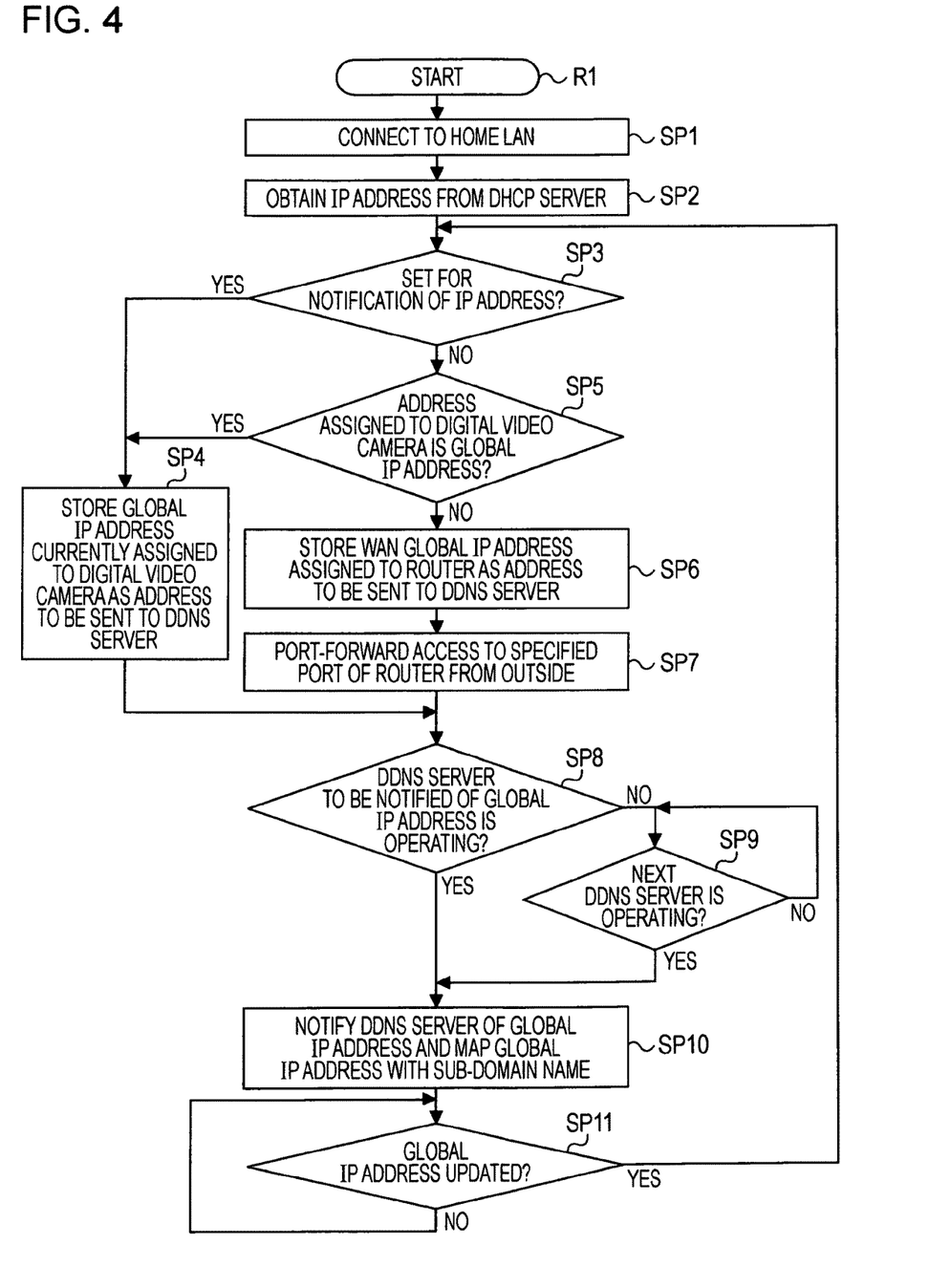
FIG. 4 is a flowchart showing a global IP address change notification processing procedure.

A global IP address change notification process performed in such a case where a global IP address is obtained and changed, for automatically registering or updating the mapping relationship between the global IP address and a domain name according to a predetermined address change notification program will be more specifically described with reference to a flowchart of FIG. 4.

In actual use, the CPU 81 of the digital video camera 80 enters a start step of a routine R1 and then proceeds to step SP1, in which the digital video camera 80 is connected to the home LAN 90 to enable communication connection with outside via the router 100 and the Internet 6. Then, the CPU 81 proceeds to step SP2.

In step SP2, if the router 100 does not have the DHCP server function, the CPU 81 of the digital video camera 80 obtains a global IP address from the DHCP server 10 of the ISP 2. If the router 100 has the DHCP server function, the CPU 81 obtains a local IP address from the router 100. Then, the CPU 81 proceeds to step SP3.

In step SP3, the CPU 81 of the digital video camera 80 determines whether or not a setting has been made to notify one of the DDNS servers 160A to 160C of the DDNS administrators 5A to 5C of the IP address. If a positive determination is obtained, the CPU 81 proceeds to step SP4.

In step SP4, the CPU 81 of the digital video camera 80 stores the global IP address currently assigned to the digital video camera 80 by the DHCP server 10 of the ISP 2 into the RAM 81B as an IP address to be sent to one of the DDNS servers 160A to 160C. Then, the CPU 81 proceeds to step SP8.

If a negative determination is obtained in step SP3, on the other hand, this implies that the digital video camera 80 is not set so as to automatically notify one of the DDNS servers 160A to 160C of the DDNS administrators 5A to 5C of the IP address. In this case, the CPU 81 of the digital video camera 80 proceeds to step SP5.

In step SP5, the CPU 81 of the digital video camera 80 determines whether or not the IP address assigned to the digital video camera 80 is a global IP address. If a positive determination is obtained, the CPU 81 proceeds to step SP4.

If a negative determination is obtained in step SP5, on the other hand, this implies that the digital video camera 80 is assigned a local IP address rather than a global IP address. In this case, the CPU 81 of the digital video camera 80 proceeds to step SP6.

In step SP6, the CPU 81 of the digital video camera 80 stores, as an IP address to be sent to one of the DDNS servers 160A to 160C, a wide area network (WAN) global IP address currently assigned to the router 100 serving as a gateway in the home 3 because the digital video camera 80 is not accessible from outside even if any of the DDNS servers 160A to 160C is notified of the local IP address assigned to the digital video camera 80. Then, the CPU 81 proceeds to step SP7.

In step SP7, the CPU 81 of the digital video camera 80 sets the port forwarding setup so that access to a specific port (for example, port 80) of the router 100 from outside is forwarded to the digital video camera 80. Then, the CPU 81 proceeds to step SP8.

In step SP8, the CPU 81 of the digital video camera 80 determines whether or not a server set as default to be accessed first, e.g., the DDNS server 160A of the DDNS administrator 5A, is currently operating by accessing the DDNS server 160A. If a positive determination is obtained, the CPU 81 proceeds to step SP10.

In step SP10, since the DDNS server 160A of the DDNS administrator 5A, which is set as default to be accessed first, is currently operating, the CPU 81 of the digital video camera 80 notifies the DDNS server 160A of the global IP address stored in the RAM 81B by using the DDNS server unique part software module 314A including functions corresponding to the DDNS server 160A, such as access procedures and instructions for transactions, and registers the mapping between the domain name and global IP address of the digital video camera 80 or the router 100 in the DDNS server 160A. Then, the CPU 81 proceeds to step SP11.

If a negative determination is obtained in step SP8, on the other hand, this implies that the DDNS server 160A in which the mapping between the domain name and the global IP address is to be registered is not currently operating. In this case, the CPU 81 of the digital video camera 80 proceeds to step SP9.

In step SP9, the CPU 81 of the digital video camera 80 determines whether or not a server set as default to be accessed next, e.g., the DDNS server 160B of the DDNS administrator 5B, is currently operating by accessing the DDNS server 160B.

If a negative determination is obtained in step SP9, this implies that the DDNS server 160B to be accessed next is not currently operating and that it is difficult to map the domain name and global IP address of the router 100 or the digital video camera 80. In this case, the CPU 81 of the digital video camera 80 returns to step SP9.

In step SP9, the CPU 81 of the digital video camera 80 further determines whether or not a server set as default to be accessed next, e.g., the DDNS server 160C of the DDNS administrator 5C, is currently operating by accessing the DDNS server 160C.

If a positive determination is obtained in step SP9, this implies that the DDNS server 160B of the DDNS administrator 5B or the DDNS server 160C of the DDNS administrator 5C, which is set as default to be accessed next, is currently operating. In this case, the CPU 81 of the digital video camera 80 proceeds to step SP10.

In step SP10, the CPU 81 of the digital video camera 80 notifies the DDNS server 160B or 160C of the global IP address of the router 100 or the digital video camera 80 by using the DDNS server unique part software module 314B or 314C including functions corresponding to the DDNS server 160B or 160C, such as access procedures and instructions for transactions, and registers the mapping between the domain name and global IP address of the router 100 or the digital video camera 80 in the DDNS server 160B or 160C. Then, the CPU 81 proceeds to step SP11.

In step SP11, the CPU 81 of the digital video camera 80 checks the WAN global IP address assigned to the router 100 or the global IP address directly assigned to the digital video camera 80 by using the UPnP client software module 310 to determine whether or not the global IP address has been changed by the DHCP server 10 of the ISP 2.

If a negative determination is obtained in step SP11, it is not necessary to change the mapping relationship between the domain name and global IP address of the router 100 or the digital video camera 80 because the global IP address is not changed. Then, the CPU 81 of the digital video camera 80 returns to step SP11 after a certain period of time, and checks whether or not the global IP address has been changed.

If a positive determination is obtained in step SP11, on the other hand, it is necessary to change the mapping relationship between the domain name and global IP address of the router 100 or the digital video camera 80 because the global IP address has been changed by the DHCP server 10. In this case, the CPU 81 of the digital video camera 80 repeats the processing after step SP3.

Global IP Address Changing Process Through Homepage

In the network system 1, furthermore, a link for accessing the digital video camera 80 is placed on a homepage provided by the user, and the digital video camera 80 is accessed via the link from the personal computer 120 in the office 4 or any other personal computer to obtain video footage captured by the digital video camera 80.

However, if a global IP address for directly accessing the digital video camera 80 or the global IP address of the router 100 which has assigned a local IP address to the digital video camera 80 is dynamically changed to a global IP address having a different value by the DHCP server 10 of the ISP 2 after a predetermined period of time has elapsed, it is difficult to access the digital video camera 80 via the link on the homepage from the personal computer 120 in the office 4 or any other personal computer.

In order to address this difficulty, the network system 1 is configured such that once the link on the homepage is accessed from the personal computer 120 in the office 4 or any other personal computer, the digital video camera 80 can be accessed at any time even if the global IP address has been dynamically changed.

In actual use, in the network system 1, if the router 100 in the home 3 does not have the DHCP server function and if the digital video camera 80 is directly assigned a global IP address by the DHCP server 10 of the ISP 2, the global IP address is embedded as a link destination of the homepage.

In the network system 1, furthermore, if the router 100 has the DHCP server function and if the digital video camera 80 is assigned a local IP address, the global IP address of the router 100 is embedded as a link destination of the homepage so that the digital video camera 80 may be accessible via the router 100 using the port forwarding function.

Figure 5:
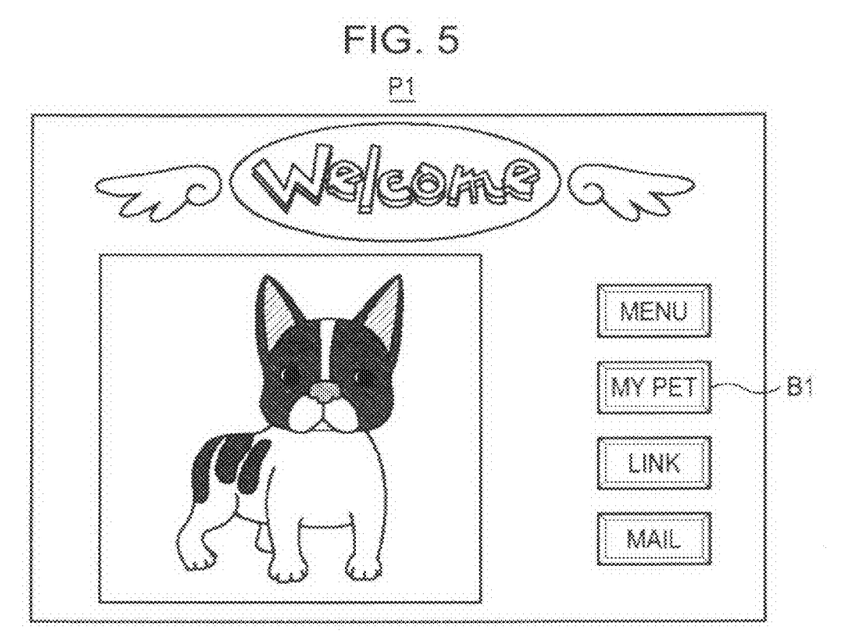
FIG. 5 is a schematic diagram showing a top page of a homepage.

For example, as shown in FIG. 5, it is assumed that a homepage run by the user having the home 3 via the FTP server 30 and Web server 40 of the ISP 2 includes a top page P1 with a link button B1 to jump to a linked page "my pet".

Figure 6:
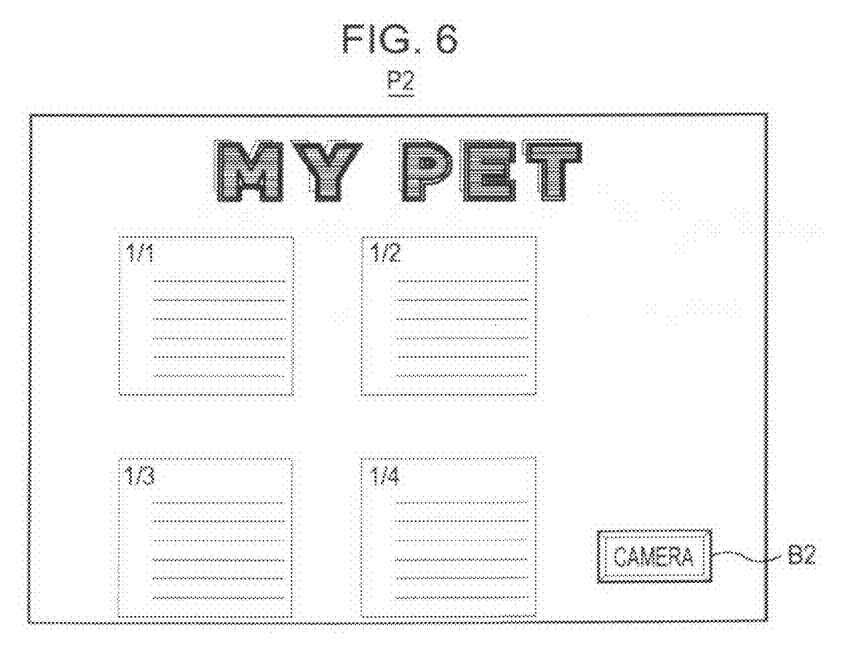
FIG. 6 is a schematic diagram showing a linked page.

In this homepage, when the link button B1 on the top page P1 is clicked, as shown in FIG. 6, a linked page P2 associated with the link button B1 is displayed. The linked page P2 includes a link button B2 named "camera" in which the global IP address of the digital video camera 80 or the global IP address of the router 100 is embedded.

In the digital video camera 80, therefore, if the digital video camera 80 is directly assigned a global IP address or if the digital video camera 80 is assigned a local IP address by the router 100 which is assigned a global IP address, when the global IP address is changed by the DHCP server 10 of the ISP 2, a changed global IP address is re-embedded in the link button B2 on the linked page P2 according to a predetermined address update program. A procedure for updating the global IP address will specifically be described with reference to a flowchart of FIG. 7.

Figure 7:
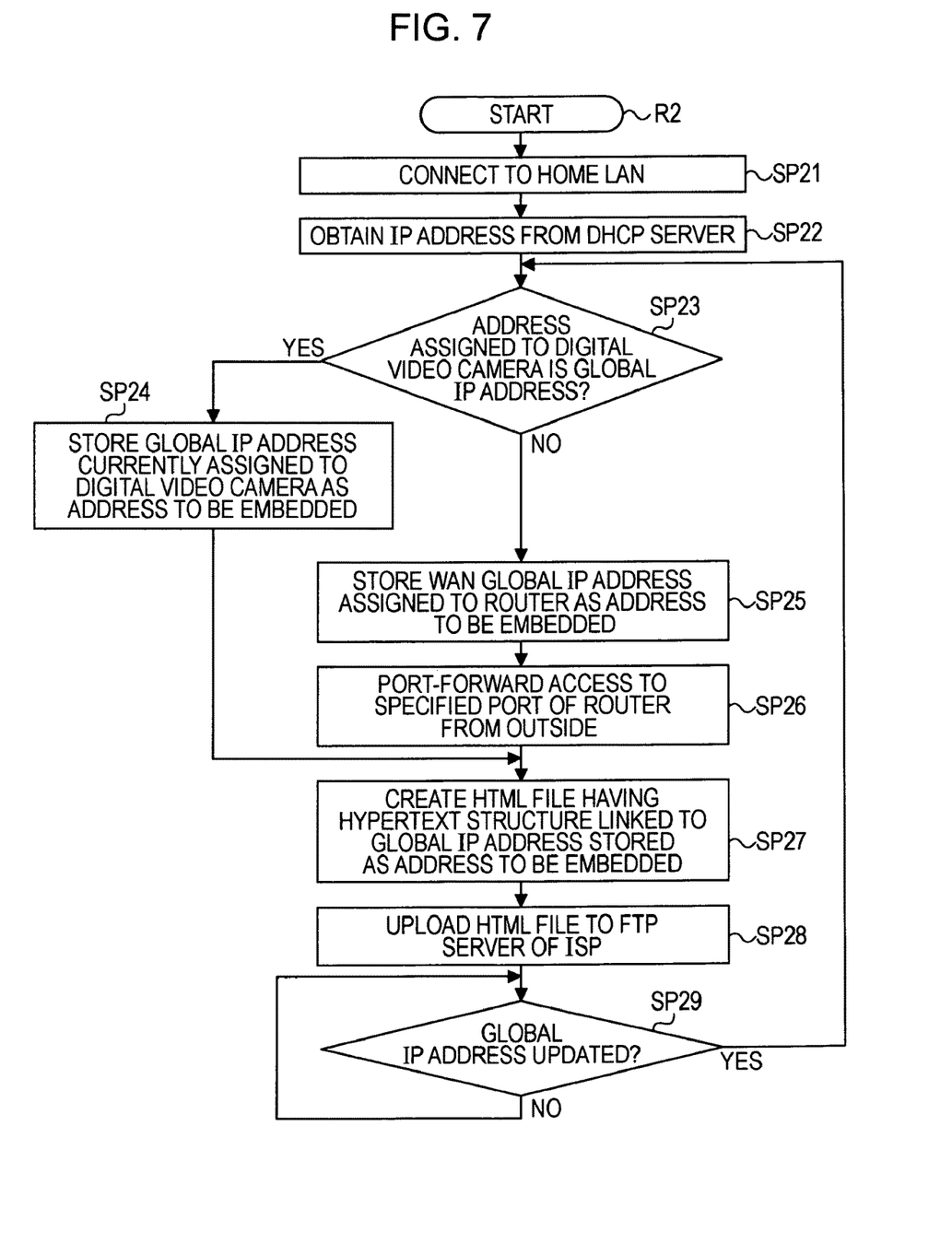
FIG. 7 is a flowchart showing a global IP address update processing procedure.

In actual use, the CPU 81 of the digital video camera 80 enters a start step of a routine R2 and then proceeds to step SP21, in which the digital video camera 80 is connected to the home LAN 90 to enable communication connection with outside via the router 100 and the Internet 6. Then, the CPU 81 proceeds to step SP22.

In step SP22, if the router 100 does not have the DHCP server function, the CPU 81 of the digital video camera 80 obtains a global IP address from the DHCP server 10 of the ISP 2. If the router 100 has the DHCP server function, the CPU 81 obtains a local IP address from the router 100. Then, the CPU 81 proceeds to step SP23.

In step SP23, the CPU 81 of the digital video camera 80 determines whether or not the IP address assigned to the digital video camera 80 is a global IP address. If a positive determination is obtained, the CPU 81 proceeds to step SP24.

If a negative determination is obtained in step SP23, on the other hand, this implies that the digital video camera 80 is assigned a local IP address rather than a global IP address. In this case, the CPU 81 of the digital video camera 80 proceeds to step SP25.

In step SP24, the CPU 81 of the digital video camera 80 stores a global IP address directly assigned to the digital video camera 80 by the DHCP server 10 of the ISP 2 into the RAM 81B as an address to be embedded in the link button B2 on the linked page P2 (see FIG. 6). Then, the CPU 81 proceeds to step SP27.

In step SP25, the CPU 81 of the digital video camera 80 stores a WAN global IP address currently assigned to the router 100 serving as a gateway in the home 3 into the RAM 81B as an address to be embedded in the link button B2 on the linked page P2 (see FIG. 6) because the digital video camera 80 is not accessible from outside even if the local IP address assigned to the digital video camera 80 is embedded as a link destination. Then, the CPU 81 proceeds to step SP26.

In step SP26, the CPU 81 of the digital video camera 80 sets the port forwarding setup so that access to a specific port (for example, port 80) of the router 100 from outside is forwarded to the digital video camera 80. Then, the CPU 81 proceeds to step SP27.

In step SP27, the CPU 81 of the digital video camera 80 creates a hyper text markup language (HTML) file having a hypertext structure in which the HTML file is linked to the global IP address stored in the RAM 81B as the address to be embedded. Then, the CPU 81 proceeds to step SP28.

In step SP28, the CPU 81 of the digital video camera 80 uploads the HTML file created in step SP27 to the FTP server 30 of the ISP 2. Then, the CPU 81 proceeds to step SP29.

In step SP29, the CPU 81 of the digital video camera 80 checks the WAN global IP address assigned to the router 100 or the global IP address directly assigned to the digital video camera 80 by using the UPnP client software module 310 to determine whether or not the global IP address has been changed by the DHCP server 10 of the ISP 2.

If a negative determination is obtained in step SP29, it is not necessary to update the global IP address embedded in the link button B2 on the linked page P2 (see FIG. 6) because the global IP address is not changed. Then, the CPU 81 of the digital video camera 80 returns to step SP29 after a certain period of time, and checks the global IP address to determine whether or not the global IP address has been changed.

If a positive determination is obtained in step SP29, on the other hand, it is necessary to update the global IP address embedded in the link button B2 on the linked page P2 (see FIG. 6) because the global IP address has been changed by the DHCP server 10. In this case, the CPU 81 of the digital video camera 80 repeats the processing after step SP23. That is, the global IP address embedded in the link button B2 is updated to a changed global IP address to produce a new HTML file, and the new HTML file is uploaded to the FTP server 30.

In the network system 1, therefore, by clicking the link button B2 on the linked page P2 of the homepage run by the user of the digital video camera 80, the viewer can access the digital video camera 80 from the personal computer 120 in the office 4 or any other personal computer without being conscious of the global IP address to visually and audibly obtain video footage captured by the digital video camera 80.

Operation and Advantageous Effects

In the structure described above, the digital video camera 80 located in the home 3 in the network system 1 is configured to, when the global IP address of the router 100 serving as a gateway accessible from outside or the global IP address directly assigned to the digital video camera 80 is changed by the DHCP server 10 of the ISP 2, search for one of the DDNS servers 160A to 160C that is currently operating, and sends a changed global IP address to the one of the DDNS servers 160A to 160C that is currently operating by using a corresponding one of the DDNS server unique part software modules 314A to 314C so that the domain name of the router 100 or the digital video camera 80 and the changed global IP address can newly be associated.

Accordingly, the digital video camera 80 of the network system 1 is provided in advance with the DDNS server unique part software modules 314A to 314C corresponding to the DDNS servers 160A to 160C which can be designated as a destination to be notified of a changed global IP address, respectively. If one of the DDNS servers 160A to 160C, for example, the DDNS server 160A, is not accessible, a destination to be notified of the global IP address can be immediately changed to a next alternative candidate, namely, the DDNS server 160B or 160C.

This allows the user to access the digital video camera 80 from the personal computer 120 in the office 4 merely by inputting a domain name on a Web browser. That is, whenever the global IP address is changed, the user can access the digital video camera 80 using the alternative DDNS server 160B or 160C without being particularly conscious of the global IP address.

In the network system 1, therefore, unlike a network system of the related art, it is not necessary to perform a time-consuming process including accessing administration software (CGI application software) operating in the router 100 from an external personal computer, checking the assigned global IP address, and then causing the user of the digital video camera 80 to individually notify third parties of the global IP address via communication media such as telephone or electronic mail.

DDNS services may be provided in a variety of ways depending on each of the DDNS administrators 5A to 5C serving as service providers and the duration for which the services are provided may be changed. Desirably, a mechanism capable of flexibly meeting such changes is provided in a network device, namely, the digital video camera 80. In the related art, however, DDNS services to be received are assumed to be fixed.

In the digital video camera 80 of the network system 1 according to the embodiment of the present invention, in contrast, processes for individually notifying the plurality of DDNS servers 160A to 160C of a global IP address are performed. The processes are handled by the DDNS server unique part software modules 314A to 314C corresponding to the DDNS servers 160A to 160C, respectively. Therefore, services can be flexibly provided as compared with fixed DDNS services in the related art.

Accordingly, the personal computer 120 in the office 4 selects one of the DDNS servers 160A to 160C that is newly set as a destination to be notified of the global IP address and accesses the selected DDNS server, thereby immediately accessing the digital video camera 80 because the domain name of the router 100 in the home 3 and the changed global IP address have been registered in association with each other.

The digital video camera 80 can cope with a change in the content of the services of the DDNS servers 160A to 160C or a change in the access procedures, instructions for transactions, or the like, which individually correspond to the DDNS servers 160A to 160C, merely by updating the DDNS server unique part software modules 314A to 314C from outside.

Further, in the digital video camera 80 of the network system 1, a global IP address for accessing the digital video camera 80 is embedded in the link button B2 on the linked page P2 of the homepage so that each time the global IP address is changed, the global IP address can be updated into a changed global IP address.

In the network system 1, therefore, the user can access the digital video camera 80 from the personal computer 120 in the office 4 or any other personal computer, without being conscious of the global IP address, merely by clicking the link button B2 on the linked page P2. This ensures that the user can access the digital video camera 80 to visually and audibly obtain video footage captured by the digital video camera 80.

In the structure described above, even if the global IP address of the router 100 or the digital video camera 80 has been dynamically changed by the DHCP server 10 of the ISP 2, the digital video camera 80 of the network system 1 searches for one of the DDNS servers 160A to 160C that is currently operating, and notifies it of a changed IP address to automatically update the mapping relationship between the global IP address and domain name of the router 100 or the digital video camera 80. This ensures that the digital video camera 80 can be accessed from outside.

In addition, even if the global IP address of the router 100 or the digital video camera 80 has been dynamically changed by the DHCP server 10 of the ISP 2, the digital video camera 80 of the network system 1 updates the global IP address embedded in the link button B2 on the linked page P2 of the homepage to a new, changed global IP address. This ensures that the digital video camera 80 can be accessed from outside.

In the network system 1, therefore, even if a network environment thereof is changed from time to time, the connection state for the entire network can be continuously maintained, and a more easy-to-use network environment than that of the related art can be established.

Other Embodiments

In the foregoing embodiment, by way of example, three DDNS server unique part software modules, namely, the DDNS server unique part software modules 314A to 314C corresponding to the plurality of DDNS servers 160A to 160C, respectively, are provided in advance. Alternatively, in an embodiment of the present invention, a number of DDNS server unique part software modules corresponding to the number of DDNS servers to be set as alternative candidates may be provided in advance.

In the foregoing embodiment, further, by way of example, the user of the digital video camera 80 in the home 3 and the user who accesses the digital video camera 80 from the personal computer 120 via the Internet 6 when he or she is working in the office 4 are identical. Alternatively, in an embodiment of the present invention, the user of the digital video camera 80 and the user who operates the personal computer 120 in the office 4 may not be identical.

In this case, the user of the digital video camera 80 may send information regarding the DDNS servers 160A to 160C that includes mapping between a domain name and a global IP address to the personal computer 120 in the office 4.

In the foregoing embodiment, further, by way of example, the network system 1 is applied to a wide area network in which the digital video camera 80 connected to the home LAN 90 in the home 3 and the personal computer 120 connected to the office LAN 130 in the office 4 are connected via the Internet 6. Alternatively, in an embodiment of the present invention, the network system 1 may be applied to closed networks such as a LAN, a personal area network (PAN), a WAN, and a metropolitan area network (MAN).

In this case, a local IP address used in a closed network may be sent to a DDNS server, and the mapping relationship between a domain name and the local IP address may be registered.

In the foregoing embodiment, further, by way of example, the user monitors video footage of the digital video camera 80 in the home 3 from the personal computer 120 in the office 4. Alternatively, in an embodiment of the present invention, when a sound picked up by the sound pickup unit 88, such as a glass breaking sound, is detected by the sound detection module 315, the CPU 81 of the digital video camera 80 may transmit an audio file containing the sound to the personal computer 120 at a pre-registered transmission destination by using the SMTP client software module 308 via electronic mail to alert the user of the personal computer 120 to view the video footage of the digital video camera 80.

In the foregoing embodiment, further, by way of example, the CPU 81 of the digital video camera 80 executes the global IP address change notification processing procedure of the routine R1 (see FIG. 4) according to an address change notification program which may be an application program started from the ROM 81A. Alternatively, in an embodiment of the present invention, the global IP address change notification processing procedure described above may be executed according to an address change notification program installed from a recording medium such as a compact disc (CD) or a semiconductor memory, an address change notification program downloaded over the Internet, or an address change notification program installed through any other route.

In the foregoing embodiment, further, by way of example, the CPU 81 of the digital video camera 80 executes the global IP address update processing procedure of the routine R2 (see FIG. 7) according to an address update program which may be an application program started from the ROM 81A. Alternatively, in an embodiment of the present invention, the global IP address update processing procedure described above may be executed according to an address update program installed from a recording medium such as a CD or a semiconductor memory, an address update program downloaded over the Internet, or an address update program installed through any other route.

In the foregoing embodiment, further, by way of example, the network system 1 is applied to a wide area network environment in which the digital video camera 80 connected to the home LAN 90 in the home 3 and the personal computer 120 connected to the office LAN 130 in the office 4 are connected via the Internet 6. Alternatively, in an embodiment of the present invention, the network system 1 may be applied to a local area network environment having no access from a network other than an internal local network without the intervention of the Internet.

Figure 8:
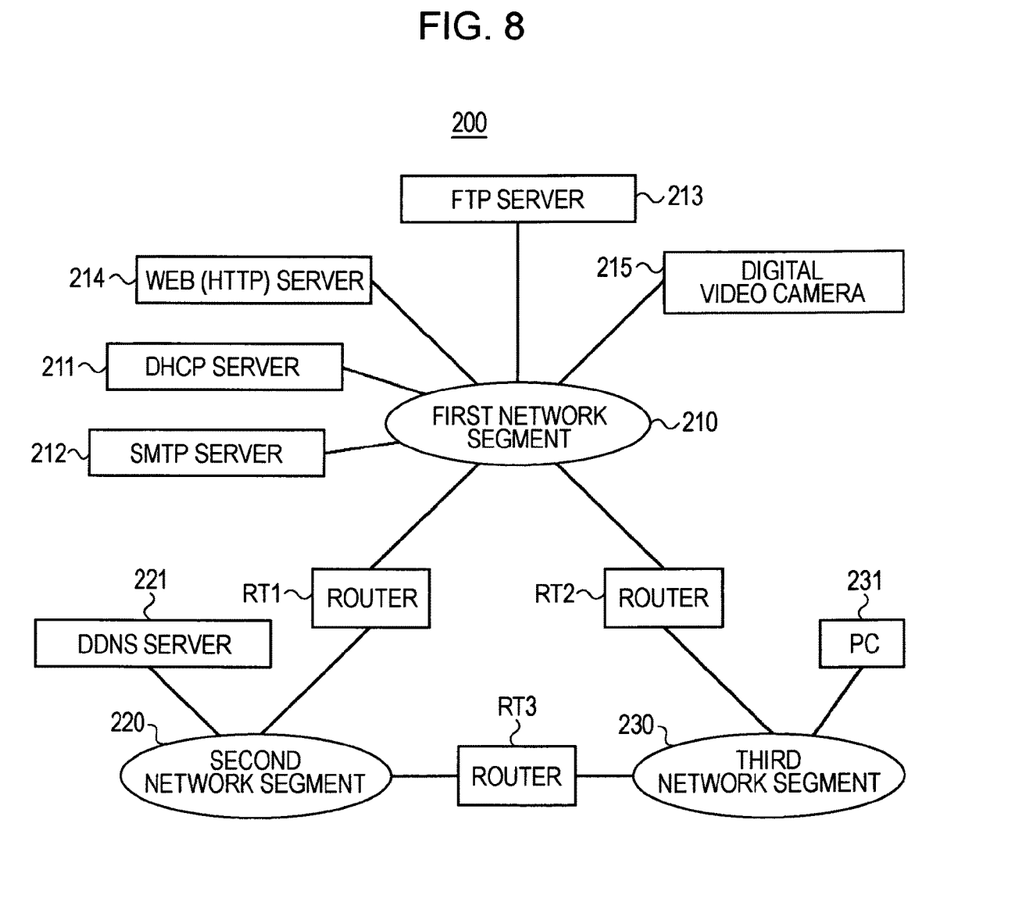
FIG. 8 is a schematic block diagram showing an overall structure of a network system according to another embodiment of the present invention.

For example, as shown in FIG. 8, a network system 200 in a local network is configured such that a DHCP server 211, an SMTP server 212, an FTP server 213, a Web server 214, and a digital video camera 215 are connected to a first network segment 210, a DDNS server 221 is connected to a second network segment 220, and a personal computer 231 is connected to a third network segment 230, in which the first, second, and third network segments 210, 220, and 230 are connected via a network using routers RT1, RT2, and RT3, respectively. In the network system 200, it is not necessary to use a global IP address. A local IP address assigned to the digital video camera 215 may be used to notify the DDNS server 221 of a changed local IP address to map the local IP address with a sub-domain name or to update a local IP address to be embedded in the link button B2 of the linked page P2 (see FIG. 6).

In the foregoing embodiment, further, by way of example, the user having the home 3 accesses the digital camera 70 or the digital video camera 80 in the home 3 from the personal computer 120 via the Internet 6 when he or she is working in the office 4 to monitor events or conditions within his or her home with the digital camera 70 or the digital video camera 80 while he or she is absent. Alternatively, in an embodiment of the present invention, the digital camera 70 or the digital video camera 80 may be placed outside the home 3, for example, in a yard, to monitor a garage containing his or her car with the digital camera 70 or the digital video camera 80 while he or she is absent (so as not to have the car stolen out of the garage).

In the foregoing embodiment, further, by way of example, the digital video camera 80 which may be a network device according to an embodiment of the present invention includes the RAM 81B which may serve as storage means, the CPU 81 which may serve as server searching means, the ROM 81A which may serve as software holding means, and the CPU 81 and the network interface 82 which may serve as address notifying means. Alternatively, a network device according to an embodiment of the present invention may include other circuit components which can serve as storage means, server searching means, software holding means, and address notifying means.

A network device, an address change notification method, and an address change notification program according to embodiments of the present invention can be applied to any network system other than a network system in which, for example, a digital camera, a digital video camera, and a personal computer are connected via the Internet. For example, a network device, an address change notification method, and an address change notification program according to embodiments of the present invention can be applied to a network system in which an Internet-accessible audio device and a cellular phone are connected via the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing device comprising:
storage means for storing an Internet protocol address assigned to the image capturing device as a notification address to be sent to a plurality of domain name servers in which an address domain mapping relationship between the Internet protocol address and a domain name of the image capturing device is to be registered;
server searching means for searching for an in operation domain name server among the plurality of domain name servers, the in operation domain name server being a domain name server that is currently operating;
software holding means for holding a plurality of unique communication program modules, each corresponding to one of the plurality of domain name servers;
address notifying means for notifying the in operation domain name server of the Internet protocol address through a corresponding one of the communication program modules to register the address domain mapping relationship in the in operation domain name server;
determining means for determining whether or not the Internet protocol address has been changed;
address updating means for updating a hypertext markup language (HTML) file with the Internet protocol address of the image capturing device in response to detection of a change in the Internet Protocol Address by the determining means, such that the HTML file provides an external network link for viewing of image content captured by the image capturing device,
the in operation server is one of a multiple of alternative candidate servers, any one of the multiple alternative candidate servers being operable to register the address domain mapping relationship; and
determining means for determining whether the Internet protocol address is a global Internet protocol address or a private Internet protocol address,
wherein when the determining means determines that the Internet protocol address is a private Internet protocol address, the image capturing device determines a wide area network global Internet protocol address of a router currently connected to the image capturing device, and the address notifying means notifies the in operation domain name server of the wide area network global Internet protocol address through the corresponding one of the communication program modules to register an address domain mapping relationship between the wide area network global Internet protocol address and the domain name in the in operation domain name server.

2. The image capturing device according to claim 1, wherein the address notifying means notifies the in operation domain name server of a changed Internet protocol address to update the address domain mapping relationship in the in operation domain name server.

3. An address change notification method executed by an image capturing device comprising the steps of:

storing an Internet protocol address assigned to the image capturing device in predetermined storage means as a notification address to be sent to a plurality of domain name servers in which an address domain mapping relationship between the Internet protocol address and a domain name of the image capturing device is to be registered;

searching, using server searching means, for an in operation domain name server among the plurality of domain name servers, the in operation domain name server being a domain name server that is currently operating;

holding a plurality of unique communication program modules in predetermined software holding means, each unique communication program module corresponding to one of the plurality of domain name servers;

determining whether or not the Internet protocol address has been changed;

updating a hypertext markup language (HTML) file with the Internet protocol address of the image capturing device in response to detection of a change in the Internet Protocol Address, such that the HTML file provides an external network link for viewing of image content captured by the image capturing device;

notifying, using address notifying means, the in operation domain name server of the Internet protocol address through a corresponding one of the communication program modules to register the address domain mapping relationship in the in operation domain name server, the in operation server is one of a multiple of alternative candidate servers, any one of the multiple alternative candidate servers being operable to register the address domain mapping relationship; and determining means for determining whether the Internet protocol address is a global Internet protocol address or a private Internet protocol address, wherein when the determining means determines that the Internet protocol address is a private Internet protocol address, the image capturing device determines a wide area network global Internet protocol address of a router currently connected to the image capturing device, and the address notifying means notifies the in operation domain name server of the wide area network global Internet protocol address through the corresponding one of the communication program modules to register an address domain mapping relationship between the wide area network global Internet protocol address and the domain name in the in operation domain name server.

4. A non-transitory computer-readable medium storing an address change notification program for causing an image capturing device to execute the steps of:

storing an Internet protocol address assigned to the image capturing device in predetermined storage means as a notification address to be sent to a plurality of domain name servers in which an address domain mapping relationship between the Internet protocol address and a domain name of the image capturing device is to be registered;

searching, using server searching means, for an in operation domain name server among the plurality of domain name servers, the in operation domain name server being a domain name server that is currently operating;

holding a plurality of unique communication program modules in predetermined software holding means, each unique communication program module corresponding to one of the plurality of domain name servers;

determining whether or not the Internet protocol address has been changed;

updating a hypertext markup language (HTML) file with the Internet protocol address of the image capturing device in response to detection of a change in the Internet Protocol Address, such that the HTML file provides an external network link for viewing of image content captured by the image capturing device;

notifying, using address notifying means, the in operation domain name server of the Internet protocol address through a corresponding one of the communication program modules to register the address domain mapping relationship in the in operation domain name server, the in operation server is one of a multiple of alternative candidate servers, any one of the multiple alternative candidate servers being operable to register the address domain mapping relationship; and determining means for determining whether the Internet protocol address is a global Internet protocol address or a private Internet protocol address, wherein when the determining means determines that the Internet protocol address is a private Internet protocol address, the image capturing device determines a wide area network global Internet protocol address of a router currently connected to the image capturing device, and the address notifying means notifies the in operation domain name server of the wide area network global Internet protocol address through the corresponding one of the communication program modules to register an address domain mapping relationship between the wide area network global Internet protocol address and the domain name in the in operation domain name server.

5. An image capturing device comprising:

a storage unit configured to store an Internet protocol address assigned to the image capturing device as a notification address to be sent to a plurality of domain name servers in which an address domain mapping relationship between the Internet protocol address and a domain name of the image capturing device is to be registered;

a server searching unit configured to search for an in operation domain name server among the plurality of domain name servers, the in operation domain name server being a domain name server that is currently operating;

a software holding unit configured to hold a plurality of unique communication program modules, each corresponding to one of the plurality of domain name servers;

an address notifying unit configured to notify the in operation domain name server of the Internet protocol address through a corresponding one of the communication program modules to register the address domain mapping relationship in the in operation domain name server;

an address change detection unit configured to determine whether or not the Internet protocol address has been changed;

a hypertext markup language updating unit configured to update a hypertext markup language (HTML) file with the Internet protocol address of the image capturing device in response to detection of a change in the Internet Protocol Address by the address change detection unit, such that the HTML file provides an external network link for viewing of image content captured by the image capturing device;

the in operation server is one of a multiple of alternative candidate servers, any one of the multiple alternative candidate servers being operable to register the address domain mapping relationship; and determining means for determining whether the Internet protocol address is a global Internet protocol address or a private Internet protocol address, wherein when the determining means determines that the Internet protocol address is a private Internet protocol address, the image capturing device determines a wide area network global Internet protocol address of a router currently connected to the image capturing device, and the address notifying means notifies the in operation domain name server of the wide area network global Internet protocol address through the corresponding one of the communication program modules to register an address domain mapping relationship between the wide area network global Internet protocol address and the domain name in the in operation domain name server.

\* \* \* \* \*